(12) United States Patent
Toussi

(10) Patent No.: US 6,874,067 B2
(45) Date of Patent: Mar. 29, 2005

(54) ELIMINATING UNNECESSARY DATA PRE-FETCHES IN A MULTIPROCESSOR COMPUTER SYSTEM

(75) Inventor: Farnaz Toussi, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 10/120,991

(22) Filed: Apr. 11, 2002

(65) Prior Publication Data

US 2003/0196043 A1 Oct. 16, 2003

(51) Int. Cl.⁷ .............................................. G06F 12/00
(52) U.S. Cl. ..................... 711/137; 711/213; 712/207; 712/237
(58) Field of Search .............................. 711/137, 213; 712/207, 237

(56) References Cited

U.S. PATENT DOCUMENTS

| 5,586,294 A | * 12/1996 | Goodwin et al. ........... 711/137 |
| 5,721,865 A | * 2/1998 | Shintani et al. ............. 711/137 |
| 5,881,303 A | * 3/1999 | Hagersten et al. ............ 712/30 |
| 6,134,634 A | * 10/2000 | Marshall et al. ............ 711/143 |

* cited by examiner

Primary Examiner—Nasser Moazzami
Assistant Examiner—Bao Q Truong
(74) Attorney, Agent, or Firm—Dugan & Dugan, PC

(57) ABSTRACT

A multiprocessor computer system employs a number of levels of cache memories with each processor. A cache controller for a lower level cache memory receives a memory block pre-fetch request which requests a particular memory block. The cache controller determines a likelihood that the particular memory block will be invalidated prior to use of the memory block by a processor which issued the pre-fetch request. Based on that determination, the cache controller determines whether to honor the pre-fetch request.

12 Claims, 4 Drawing Sheets

ELIMINATING UNNECESSARY DATA PRE-FETCHES IN A MULTIPROCESSOR COMPUTER SYSTEM

FIELD OF THE INVENTION

The present invention is concerned with computer systems, and is more particularly concerned with computer systems in which plural processors are included.

BACKGROUND OF THE INVENTION

FIG. 1 is a block diagram that illustrates a conventional multiprocessor computer system in which the present invention may be applied. In FIG. 1 reference numeral 10 generally indicates the multiprocessor computer system.

The multiprocessor computer system 10 includes a plurality of nodes, of which only two nodes (node 1—reference numeral 12—and node m—reference numeral 14) are shown in the drawing. The nodes of the multiprocessor computer system 10, including nodes 12 and 14, are connected to each other and to a main memory 16 via an interconnecting bus/network 18.

Because all of the nodes of the multiprocessor computer system 10 may be of the same construction, only the node 12 (node 1) is shown in detail.

The node 12 includes a processor 20 (processor p1). (It will be appreciated that each other node of the multiprocessor computer system 10 includes a respective processor.) Associated with the processor 20 is an upper level cache memory 22 (cache L1). A cache controller 24 is associated with and controls operation of the cache memory 22. The node 12 also includes lower level cache memories 26, 28. A respective cache controller 24 is associated with, and controls operation of, each of the cache memories 26, 28. The lower level cache memories 26, 28 may be dedicated for use by the processor 20 (processor p1). Alternatively, some or all of the lower level cache memories 26, 28 may be shared with another processor 30 (processor p2) which may, with its associated upper level cache 32, be part of the same node 12 (node 1).

As is well known to those who are skilled in the art, cache memories are provided to store data that is likely to be needed by the processor in the near future. Cache memories feature shorter access times than the main memory 16 of the multiprocessor computer system 10. For example, the upper level cache memory 22 may be provided on-chip with the processor 20, thereby providing fastest access times. The lower level cache memories 26, 28 provide slower access times than the upper level cache memory 22, but are more closely associated with the processor 20, and thereby provide faster access times, than the main memory 16.

FIG. 2 is a block diagram that illustrates a typical one of the cache memories 22, 26, 28, 30. The cache memory of FIG. 2, which is denoted by reference numeral 34, includes a data storage facility 36 and a directory 38. As indicated at 40, the data storage facility 36 stores blocks of data 42. As illustrated at 44, the directory 38 stores for each data block 42 in the data storage facility 36 a block address 46 and a "state" 48. The block addresses 46 are correlated with block addresses in the main memory 16. The states 48 are maintained to ensure data integrity using a cache coherence protocol in a multiprocessor environment.

As is familiar to those who are skilled in the art, a cache coherency protocol assures that consistent views of the data are maintained by the various processors of the multiprocessor computer system 10. According to one cache coherency protocol, known as the "MESI" protocol, the possible states for the memory blocks stored in a cache memory 34 are "modified", "exclusive", "shared", and "invalid".

A block of memory is assigned the "modified" state when it is the only valid copy among all the cache memories, and is not consistent with the copy in main memory. The "exclusive" state is assigned when the memory block is the only copy in a cache memory, and is consistent with the copy in main memory. The "shared" state is assigned when multiple copies of the memory block are present among the cache memories, and are consistent with the copy in main memory. The "invalid" state signifies that the memory block must be fetched from main memory or from another cache.

The "shared" state may be sub-divided into the following sub-states: "shared read-only", which means that the cache copies were never modified, and "shared read-write", which means that the memory block was modified at least once prior to being shared.

It is known to improve performance of multiprocessor computer systems by pre-fetching data from a lower level cache memory for storage in an upper level cache memory. By pre-fetching is meant requesting data in advance so that it will be present in the upper level cache when needed by the associated processor.

A problem that may be encountered in pre-fetching data is that the data may be fetched too early. That is, the pre-fetched memory block may be invalidated before it is accessed by the processor. Such premature pre-fetches may unnecessarily utilize resources, thereby decreasing the bandwidth available for cache memory operations.

It would be desirable to improve the efficiency of operation of multiprocessor computer systems in which pre-fetching is employed.

SUMMARY OF THE INVENTION

According to a first aspect of the invention, a method of operating a multiprocessor computer system includes (a) receiving a memory block pre-fetch request which requests a particular memory block; (b) determining a likelihood that the particular memory block will be invalidated prior to use of the particularly memory block by a processor which issued the request, and (c) determining whether to fulfill the request based on a result of step (b).

In at least one embodiment, the determination of the likelihood that the particular memory block will be invalidated prior to use may include determining a state of the particular memory block. The inventive method may be performed such that, when the state of the particular memory block is determined to be shared read-write, the pre-fetch request is not fulfilled. The inventive method may be employed in connection with a multiprocessor computer system that has a Uniform Memory Access (UMA) architecture. Alternatively, the invention may be performed with multiprocessor systems having NUMA (non-uniform memory access) and COMA (cache only memory access) architectures. UMA, NUMA and COMA multiprocessor architectures are all familiar to those who are skilled in the art.

According to another aspect of the invention, a multiprocessor computer system is provided. The inventive multiprocessor computer system includes a plurality of processors operatively coupled to each other, a respective plurality of cache memories associated with each of the processors and including a high level cache memory and at least one lower level cache memory, and a respective cache controller associated with each lower level cache memory. Each cache controller includes logic circuitry for receiving a memory block pre-fetch request that requests a particular memory block, for determining a likelihood that the particular memory block will be invalidated prior to use of the particular memory block by the associated processor, and for determining whether to fulfill the pre-fetch request, in response to the circuitry which determined the likelihood that the particular memory block will be invalidated.

By selectively honoring pre-fetch requests, and declining to honor pre-fetch requests that are directed to memory blocks that are likely to be invalidated before use, cache memory access bandwidth can be conserved, thereby improving the efficiency of operation of the multiprocessor computer system.

Other objects, features and advantages of the present invention will become more fully apparent from the following detailed description of exemplary embodiments, the appended claims and the accompanying drawings.

DETAILED DESCRIPTION OF THE DRAWINGS

Figure 1:
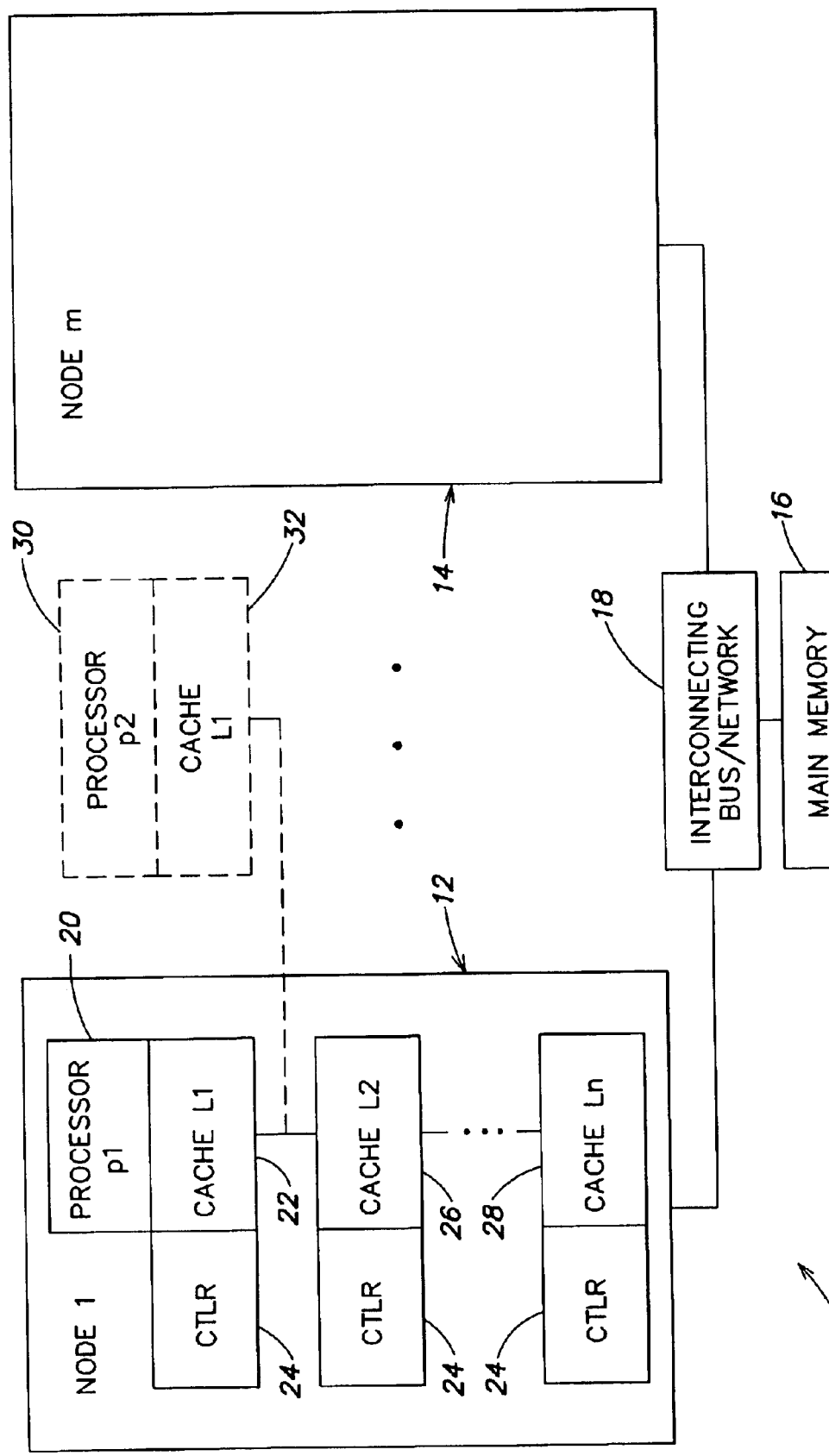
FIG. 1 is a simplified block diagram representation of a conventional multiprocessor computer system in which the present invention may be applied.
Figure 3:
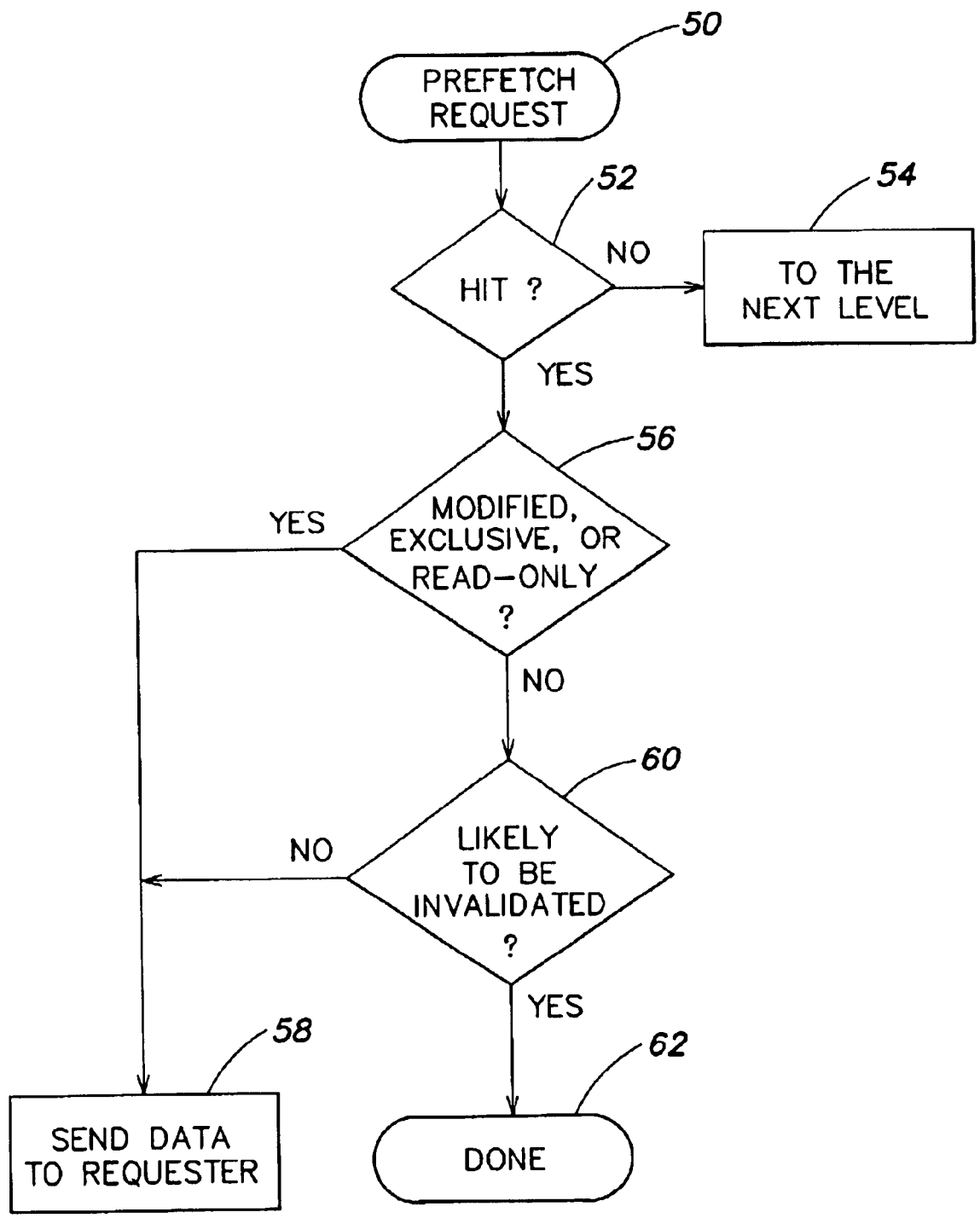
FIG. 3 illustrates, in the form of a flow chart, a process provided in accordance with the invention for selectively honoring pre-fetch requests in lower level caches of the computer system of FIG. 1.

FIG. 3 illustrates, in the form of a flow chart, a process carried out in accordance with the present invention. This process is to be implemented in a cache controller 24 associated with a lower level cache 26 or 28 (FIG. 1). The process of FIG. 3 may be embodied in suitable logic circuitry incorporated in the cache controller 24. Design and manufacture of such logic circuitry is well within the ability of those having ordinary skill in the art, based on the following disclosure of the inventive process (as described further below with reference to FIG. 4).

Figure 2:
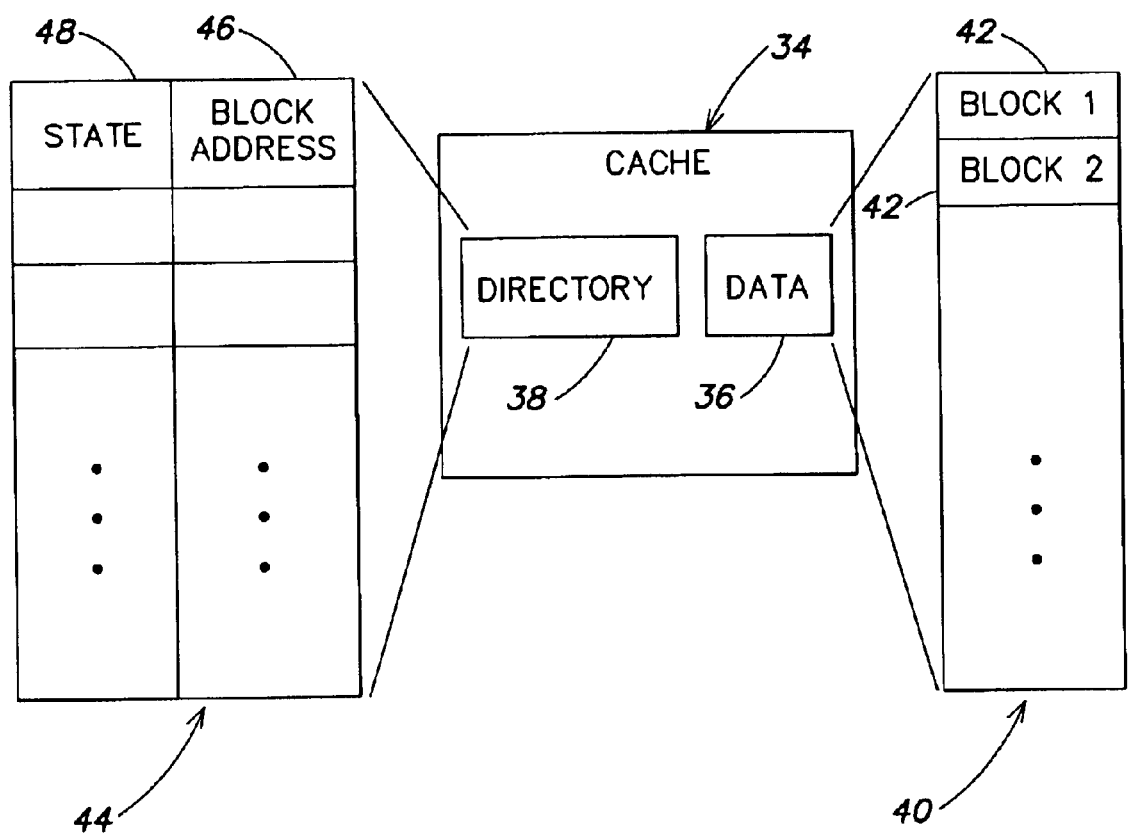
FIG. 2 is a schematic illustration of a typical cache memory that is included in the multiprocessor computer system of FIG. 1.

The inventive process begins with a block 50, at which a request to pre-fetch a particular memory block is received from a processor 20 by a controller 24 for a lower level cache 26 or 28. In accordance with conventional practice, the desired memory block is specified by its block address in main memory. Following block 50 is a decision block 52. At decision block 52 it is determined whether the desired memory block is present in the cache to which the pre-fetch request was directed. This may be done by consulting the directory 38 (FIG. 2) to determine whether the block address of the requested memory block is listed in the directory 38. If not, then block 54 follows. At block 54 the pre-fetch request is forwarded to the next lower cache memory or, if there is no next lower cache memory, the pre-fetch request is forwarded to main memory.

On the other hand, if the block address for the requested memory block is found in the directory 38, then a decision block 56 follows decision block 52.

At decision block 56, the state of the requested memory block is examined, and it is determined whether the state is one of "modified", "exclusive", or "shared read-only". If such is the case, then block 58 follows decision block 56. At block 58 the requested memory block is dispatched to the high level cache memory 22 associated with the requesting processor 20. In other words, the pre-fetch request is honored.

However, if at block 56 it is determined that the state of the requested memory block is not one of "modified", "exclusive" or "shared read-only", then decision block 60 follows decision block 56. At decision block 60 it is determined whether the requested memory block is likely to be invalidated before it is used by the requesting processor. In one embodiment, a positive determination is made at decision block 60 simply if the state of the memory block is "shared read-write".

In an alternative embodiment, the determination at decision block 60 may be based on how long (how many cycles) the memory block has been resident in the lower level cache memory. I.e., if the requested memory block has been resident in the lower level cache memory for at least N cycles without being invalidated, then it is determined that the requested memory block is not likely to be invalidated. In this embodiment, suitable circuitry is provided to track how long shared read-write memory blocks have been present in lower level cache memories. The value of N (i.e., the number of cycles that a requested memory block must have been resident in the lower level cache for the block to be determined not to be likely to be invalidated) may be programmable. For example, the value of N may be programmable based on an evaluation of a software program to be executed by the multiprocessor computer system 10.

In another alternative embodiment, the determination at decision block 60 may be based on the position of the memory block in an LRU/MRU (least recently used/most recently used) queue for the lower level cache memory. (In accordance with conventional practices an LRU/MRU queue is provided in connection with cache organization which requires block replacement.) The position of the memory block in the LRU/MRU queue may be taken as an indication of how long the memory block has been resident in the lower level cache memory. For example, if a requested memory block is in the upper half of the LRU/MRU queue (close to the most recently used memory block) than it may be determined at decision block 60 that the requested memory block is likely to be invalidated because the memory block has been resident in the cache for a relatively short time. On the other hand, if the requested memory block is in the lower half of the LRU/MRU queue (close to the least recently used block) then it may be determined at decision block 60 that the requested memory block is not likely to be invalidated because the memory block has been resident in the cache for a relatively long time.

In any event, if a positive determination is made at decision block 60, i.e., if it is determined that the requested memory block is likely to invalidated before use by the requesting processor, then the process of FIG. 3 ends (block 62) without honoring the pre-fetch request. However, if a negative determination is made at decision block 60, i.e. the requested memory block is not found likely to be invalidated prior to use by the requesting processor, then block 58 follows decision block 60 and the pre-fetch request is honored.

By selectively honoring pre-fetch requests, and declining to honor pre-fetch requests for memory blocks that are likely to be invalidated prior to use by the requesting processor, the present invention prevents wastage of cache memory access bandwidth, so that other uses of cache memory, such as fetches of memory blocks immediately required by the processor, or storing operations, may be efficiently performed.

Figure 4:
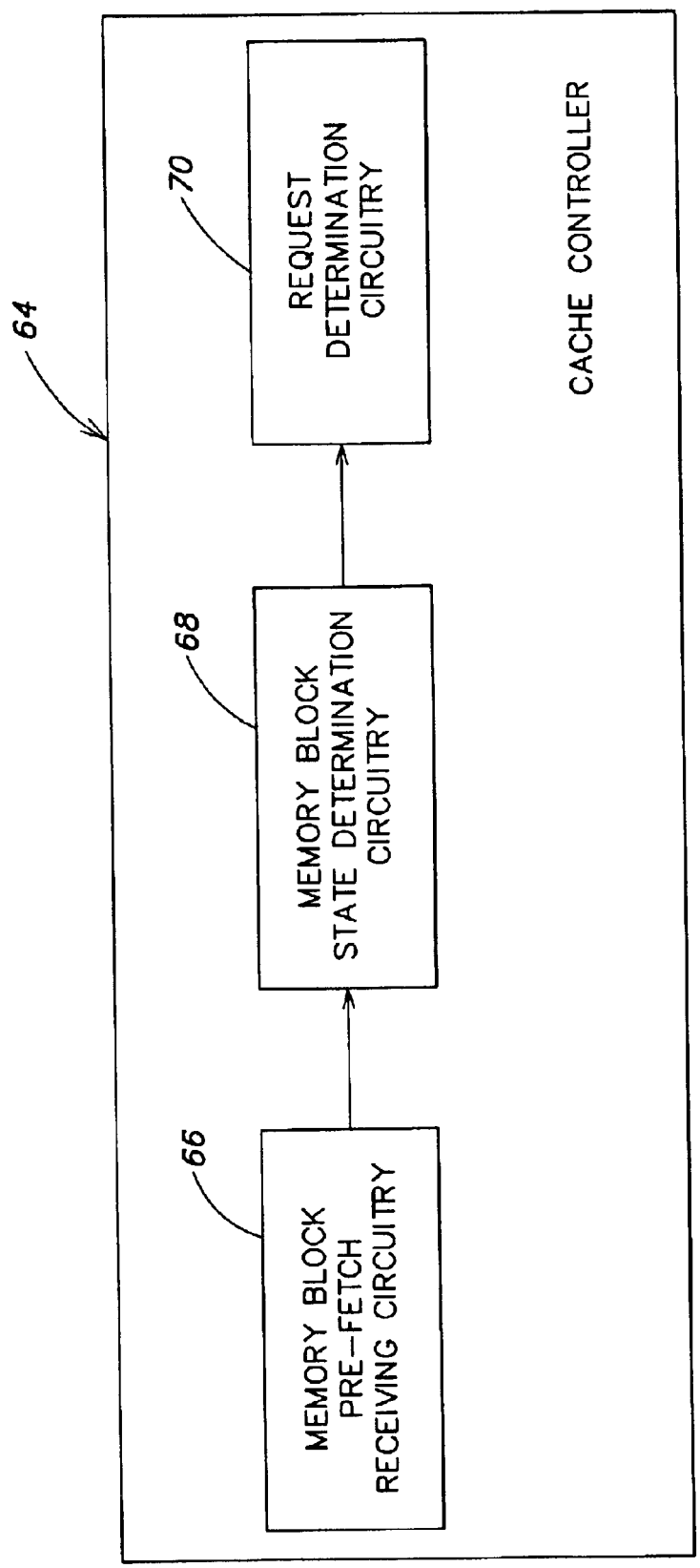
FIG. 4 is a simplified schematic illustration of circuitry included in a cache controller to implement the present invention.

As stated, the process of FIG. 3 may be embodied in suitable logic circuitry incorporated within a cache controller. FIG. 4 is a simplified schematic illustration of an exemplary embodiment of such logic circuitry. Specifically, FIG. 4 illustrates a cache controller 64 having memory block pre-fetch circuitry 66, memory block state determination circuitry 68 and request determination circuitry 70 contained therein configured to operate in accordance with the process of FIG. 3 (e.g., to receive a memory block pre-fetch request which requests a particular memory block, to determine a state of a particular memory block, and responsive to the state determination, determine whether to fulfill the pre-fetch request, respectively). In at least one embodiment, the memory block pre-fetch circuitry 66 may comprise a decoder to determine the type of request and a selector to enable the pre-fetch path; the memory state determination circuitry 68 may comprise logic to fetch the state of the requested memory block from the cache directory; and the request determination circuitry 70 may comprise logic to compare the fetched state of the requested memory block with the shared read-write state and logic to fetch the data; although other circuitry may be employed.

The foregoing description discloses only exemplary embodiments of the invention; modifications of the above disclosed apparatus and methods which fall within the scope of the invention will be readily apparent to those of ordinary skill in the art. For example, although the present invention has been illustrated in conjunction with a multiprocessor computer system having a UMA (uniform memory access) architecture, the invention is also applicable to multiprocessor computer systems having NUMA (non-uniform memory access) and COMA (cache only memory access) architectures.

Furthermore, although the invention has been illustrated in connection with a MESI (modified/exclusive/shared/invalid) cache coherency protocol, it is contemplated to use the present invention in connection with other cache coherency protocols.

Accordingly, while the present invention has been disclosed in connection with exemplary embodiments thereof, it should be understood that other embodiments may fall within the spirit and scope of the invention, as defined by the following claims.

The invention claimed is:

1. A method of operating a multiprocessor computer system, the method comprising:
    (a) receiving a memory block pre-fetch request which requests a particular memory block;
    (b) determining a likelihood that the particular memory block will be invalidated prior to use of the particular memory block by a processor which issued the request, wherein determining a likelihood includes determining a state of the particular memory block; and
    (c) determining whether to fulfill the request based on a result of step (b), wherein the request is not fulfilled when the state of the particular memory block is determined to be shared read-write.

2. The method of claim 1, wherein the multiprocessor computer system has a Uniform Memory Access (UMA) architecture.

3. A method of operating a multiprocessor computer system, the method comprising:
    (a) receiving a memory block pre-fetch request which requests a particular memory block,
    (b) determining a likelihood that the particular memory block will be invalidated prior to use of the particular memory block by a processor which issued the request, wherein determining a likelihood includes determining a number of cycles that the requested memory block has been resident in a cache memory; and
    (c) determining whether to fulfill the request based on a result of step (b), wherein the request is not fulfilled when the state of the particular memory block is determined to be shared read-write.

4. The method of claim 3, wherein the multiprocessor computer system has a Uniform Memory Access (UMA) architecture.

5. A method of operating a multiprocessor computer system, the method comprising:
    (a) receiving a memory block pre-fetch request which requests a particular memory block;
    (b) determining a state of the particular memory blocky; and
    (c) determining whether to fulfill the request based on a result of step (b), wherein the request is not fulfilled when the state of the particular memory block is determined to be shared read-write.

6. The method of claim 5, wherein the multiprocessor computer system has a Uniform Memory Access (UMA) architecture.

7. A multiprocessor computer system, comprising:
    a plurality of processors operatively coupled to each other;
    a respective plurality of cache memories associated with each of the processors and including a high level cache memory and at least one lower level cache memory; and
    a respective cache controller associated with each lower level cache memory;
    wherein each cache controller includes:
        means for receiving a memory block pre-fetch request which requests a particular memory block;
        likelihood determining means for determining a likelihood that the particular memory block will be invalidated prior to use of the particular memory block by the associated processor, wherein the likelihood determining means includes state determining means for determining a state of the particular memory block; and
    request determining means, responsive to the likelihood determining means, for determining whether to fulfill the pro-fetch request, wherein the request determining means determines not to fulfill the pre-fetch request when the state determining means determines that the state of the particular memory block is shared read-write.

8. The multiprocessor computer system of claim 7, wherein the system has a Uniform Memory Access (UMA) architecture.

9. A multiprocessor computer system, comprising:
    a plurality of processors operatively coupled to each other;
    a respective plurality of cache memories associated with each of the processors and including a high level cache memory and at least one lower level cache memory; and
    a respective cache controller associated with each lower level cache memory;

wherein each cache controller includes:

means for receiving a memory block pre-fetch request which requests a particular memory block;

likelihood determining means for determining a likelihood that the particular memory block will be invalidated prior to use of the particular memory block by the associated processor, wherein the likelihood determining means includes cycle-counting means for determining a number of cycles that the requested memory block has been resident in the respective lower level cache memory; and request determining means, responsive to the likelihood determining means, for determining whether to fulfill the pre-fetch request, wherein the request determining means determines not to fulfill the pre-fetch request when the state determining means determines that the state of the particular memory block is shared read-write.

10. The multiprocessor computer system of claim 9, wherein the system has a Uniform memory Access (UMA) architecture.

11. A multiprocessor computer system, comprising:

a plurality of processors operatively coupled to each other;

a respective plurality of cache memories associated with each of the processors and including a high level cache memory and at least one lower level cache memory; and a respective cache controller associated with each lower level cache memory;

wherein each cache controller includes:

means for receiving a memory block pre-fetch request which requests a particular memory block;

state determining means for determining a state of the particular memory block; and request determining means, responsive to the state determining means, for determining whether to fulfill the pre-fetch request, wherein the request determining means determines not to fulfill the pre-fetch request when the state determining means determines that the state of the particular memory block is shared read-write.

12. The multiprocessor computer system of claim 11, wherein the system has a Uniform Memory Access (UMA) architecture.

* * * * *

UNITED STATES PATENT AND TRADEMARK OFFICE
CERTIFICATE OF CORRECTION

PATENT NO. : 6,874,067 B2  
DATED : March 29, 2005  
INVENTOR(S) : Farnaz Toussi It is certified that error appears in the above-identified patent and that said Letters Patent is hereby corrected as shown below:

Column 6,  
Line 20, "blocky" should be -- block --.  
Line 50, "pro-fetch" should be -- pre-fetch --.

Column 7,  
Line 20, "memory" should be -- Memory --.

Signed and Sealed this

Fourteenth Day of June, 2005

JON W. DUDAS  
*Director of the United States Patent and Trademark Office*